UNITED STATES PATENT OFFICE.

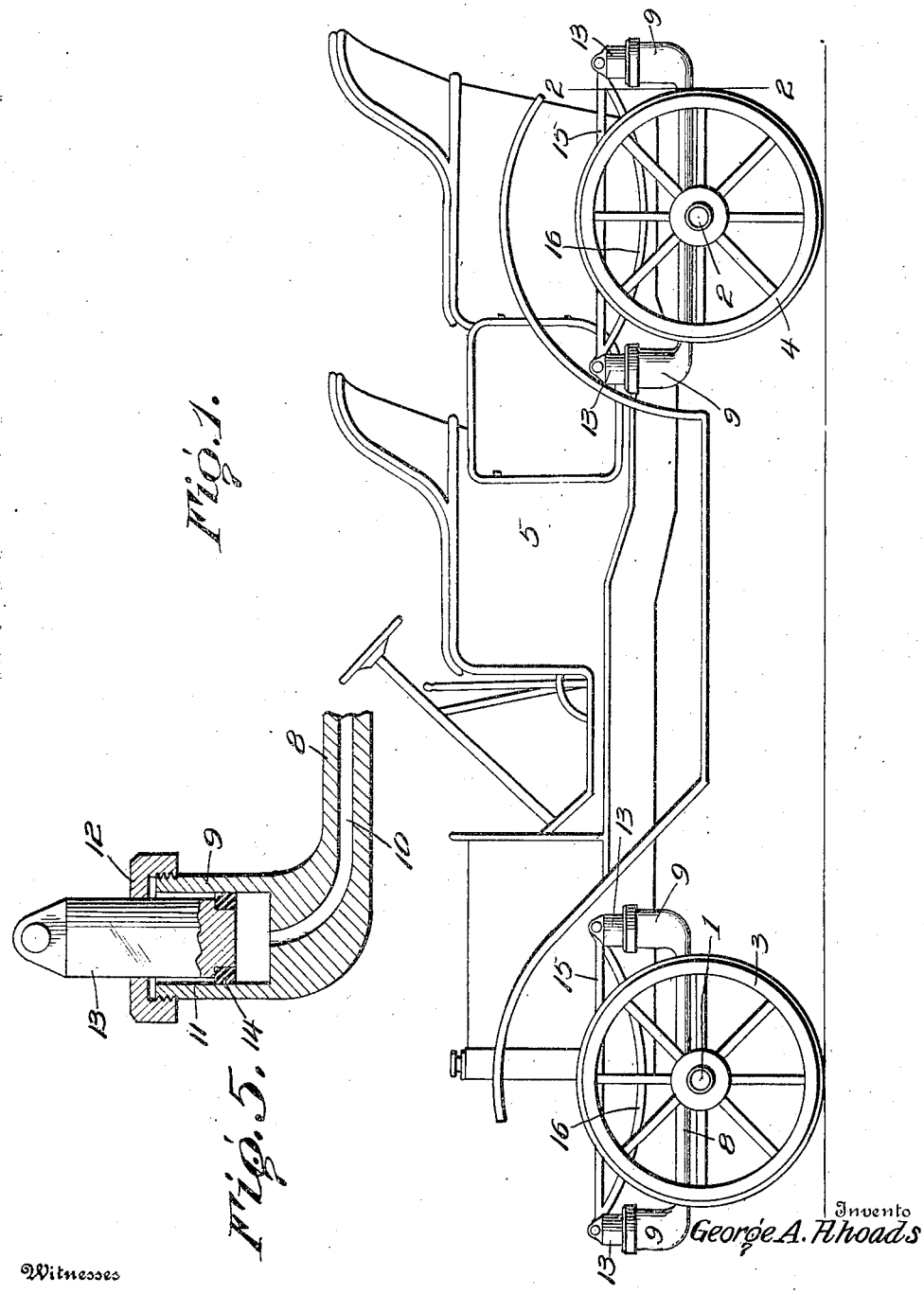

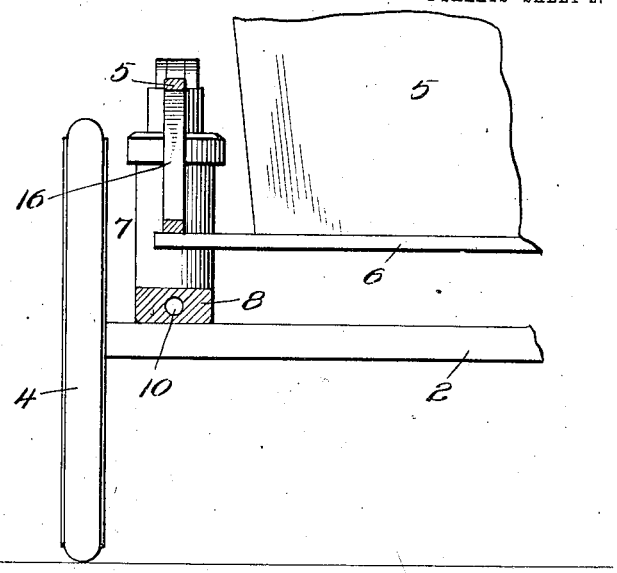
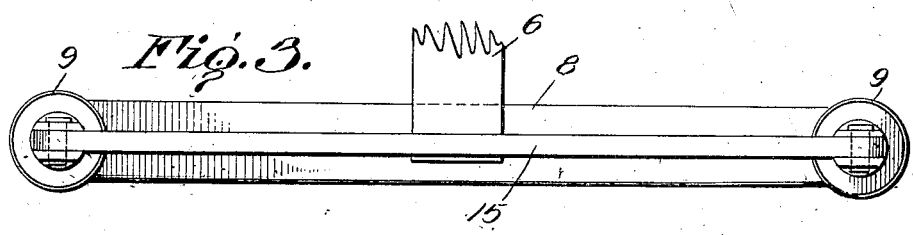
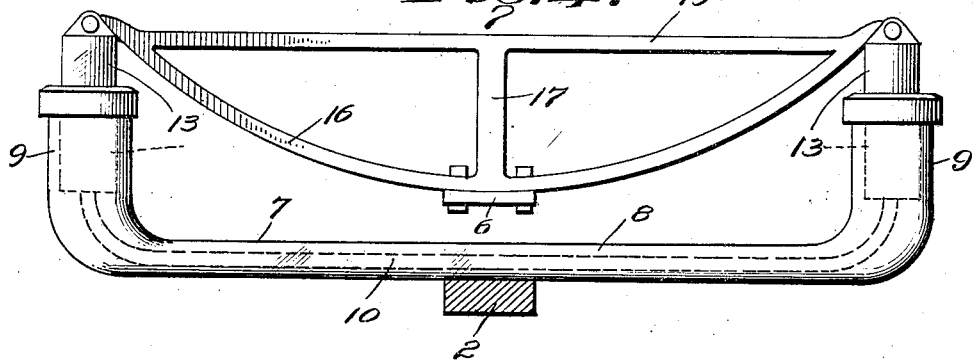

GEORGE A. RHOADS, OF UHRICHSVILLE, OHIO.

PNEUMATIC SPRING SUSPENSION FOR VEHICLES.

955,692.  Specification of Letters Patent.  Patented Apr. 19, 1910.

Application filed May 25, 1909. Serial No. 498,157.

*To all whom it may concern:*

Be it known that I, GEORGE A. RHOADS, a citizen of the United States, residing at Uhrichsville, in the county of Tuscarawas and State of Ohio, have invented new and useful Improvements in Pneumatic Spring Suspension for Vehicles, of which the following is a specification.

This invention relates to automobiles, and particularly to means for suspending the body of such a vehicle from the running gear thereof.

The object of the invention is to provide suspension means for the body of the vehicle of a pneumatic cushioning type, whereby the motions of the body of the vehicle and its running gear will be taken up and absorbed, thus enabling the body to be yieldingly supported without the use of the ordinary suspension or cushioning springs.

With these and other objects in view, the invention consists of the features of construction, combination and arrangement of parts hereinafter fully described and claimed, reference being had to the accompanying drawings, in which:—

Figure 1 is a side elevation of an automobile embodying my invention. Fig. 2 is a transverse section on the line 2—2 of Fig. 1. Fig. 3 is a top plan view of one of the pneumatic suspension devices. Fig. 4 is a side elevation of the same. Fig. 5 is a vertical section through one end of one of the suspension devices, showing the construction thereof.

Referring to the drawings, 1 and 2 designate the front and rear axles, 3 and 4 the sets of wheels mounted thereon, and 5 the body of the vehicle, which latter may be of any preferred construction suitable for use in conjunction with my improved suspending means. The body 5 is yieldingly supported from each axle, for which purpose it is provided at each end with a transverse bar 6. Associated with each bar 6 at each end of the vehicle is a pair of pneumatic suspension devices mounted respectively upon the front and rear axles with the suspension devices of each pair arranged at opposite sides of the vehicle. Each cushioning device comprises a U-shaped bracket or yoke 7 comprising a bottom bar or body portion 8 and upright end portions 9. The bar or body portion 8 is suitably fixed longitudinally of the vehicle to the adjacent axle and provided with a bore or passage 10, while the upright end portions 9 are cored out to provide cushioning chambers or cylinders 11, the two chambers or cylinders being in communication through the bore 10 and being each closed by a screw cap or head 12. Pistons or plungers 13 are movable in the respective cylinders 11 and through openings in the caps 12 and are provided at their lower ends with packing 14 to secure a tight joint and prevent escape of the contained air from the cylinders. The upper ends of these pistons project above the caps 12 and are pivotally connected by a coupling bar 15. The ends of the bar 15 are connected by a chord brace 16 arranged between the bar and body portion of the bracket, and the intermediate portion of the bar is connected with the center of the brace by a reinforcing arm 17 to give additional strength. The ends of the bar 6 at each end of the body 5 project laterally beyond said body and are bolted or otherwise fastened to the central portions of the chord braces of the adjacent suspension devices, as shown, thus coupling the pistons of the respective suspension devices with the body for vertical movement therewith. It will thus be seen that each end of the body of the vehicle is mounted at each side upon a suspension device embodying a pair of pistons or plungers vertically movable within cylinders upon coacting brackets mounted upon the adjacent axle, so that in the travel of the vehicle the body will be permitted to have vertical motion to take up and absorb the jarring vibrations from the running gear in passing over irregular surfaces. It will be understood, of course, that the cylinders 9 and connecting passage 10 of each suspension device are filled with air or other fluid under a desired pressure, the pressure being sufficient to hold the pistons elevated and the body suspended so as to permit adequate vertical motion of the pistons within the cylinders to cushion and absorb all vibrations. As the connecting bars 15 are pivotally coupled to their pistons, it will be apparent that the latter may have different degrees of movement in their cylinders to compensate for any angular relation to the horizontal the body 5 may take, the passages 10 permitting the air to flow from one cylinder to the other of each suspension device so as to provide for any variations in the movements of the pistons which may occur.

By supporting the vehicle body in the manner described the necessity of employing cushioning suspension springs which are liable to break or become otherwise inoperative, is avoided and an equally efficient yielding support for the body obtained. The suspension devices may cushion the body to a sufficient extent to permit solid tires instead of resilient tires to be employed if desired.

Claims.

1. A cushioning support for motor vehicle bodies comprising a U-shaped casting, said casting embodying vertical end portions cored to form cylinders and an intermediate base bar connecting the lower ends of said cylinders, said bar being provided with a longitudinal bore forming an equalizing passage communicating with the chambers of the cylinders, pistons operating in said cylinders, a bar pivotally connecting said pistons, and a brace depending from the bar into the space between the pistons and providing means of attachment to the body supporting part of a vehicle.

2. A cushioning support for motor vehicles comprising a pair of upright cylinders, a bar connecting the cylinders at their lower ends, said bar being provided with an equalizing passage communicating with the cylinders, pistons operating in said cylinders, a bar pivotally connecting the pistons exteriorly of the cylinders, and a member depending from said bar into the space between the cylinders and adapted for attachment at a point below the bar to the body supporting part of a vehicle.

3. A cushioning support for motor vehicle bodies comprising a pair of upright cylinders, a bar joining the lower ends of the cylinders and provided with an equalizing passage communicating therewith, pistons operating in the cylinders, a second bar pivotally connecting said pistons exteriorly of said cylinders, and a chord brace connecting the ends of said bar and depending into the space between the cylinders, said brace being adapted for connection with the body supporting part of a vehicle.

4. A cushioning support for motor vehicle bodies comprising a pair of upright cylinders, a bar joining the lower ends of said cylinders and provided with an equalizing passage communicating therewith, pistons operating in the cylinders, a second bar pivotally connecting the pistons exteriorly of the cylinders, a chord brace connecting the ends of said bar and depending into the space between the cylinders, said brace being adapted for connection with the body supporting part of a motor vehicle, and a vertical brace connecting the central portions of the bar and chord brace.

5. The combination with a vehicle body and its axle, of cushioning devices arranged at opposite sides of the body, each of said cushioning devices comprising a pair of upright cylinders, a bar resting on the axle and connecting the cylinders, said bar having an equalizing passage communicating with the cylinders, pistons operating in the cylinders, a bar pivotally connecting the pistons exteriorly of the cylinders, a brace connecting portions of the bar and depending into the space between the cylinders, and supporting means on the vehicle body connected with the braces of the suspension devices.

In testimony whereof I affix my signature in presence of two witnesses.

GEORGE A. RHOADS.

Witnesses:
C. U. PATTERSON,
BLANCHE RHOADS.